Nov. 2, 1971   R. ROUSSIN ET AL   3,616,688
GRADIOMANOMETER APPARATUS
Filed Oct. 21, 1969
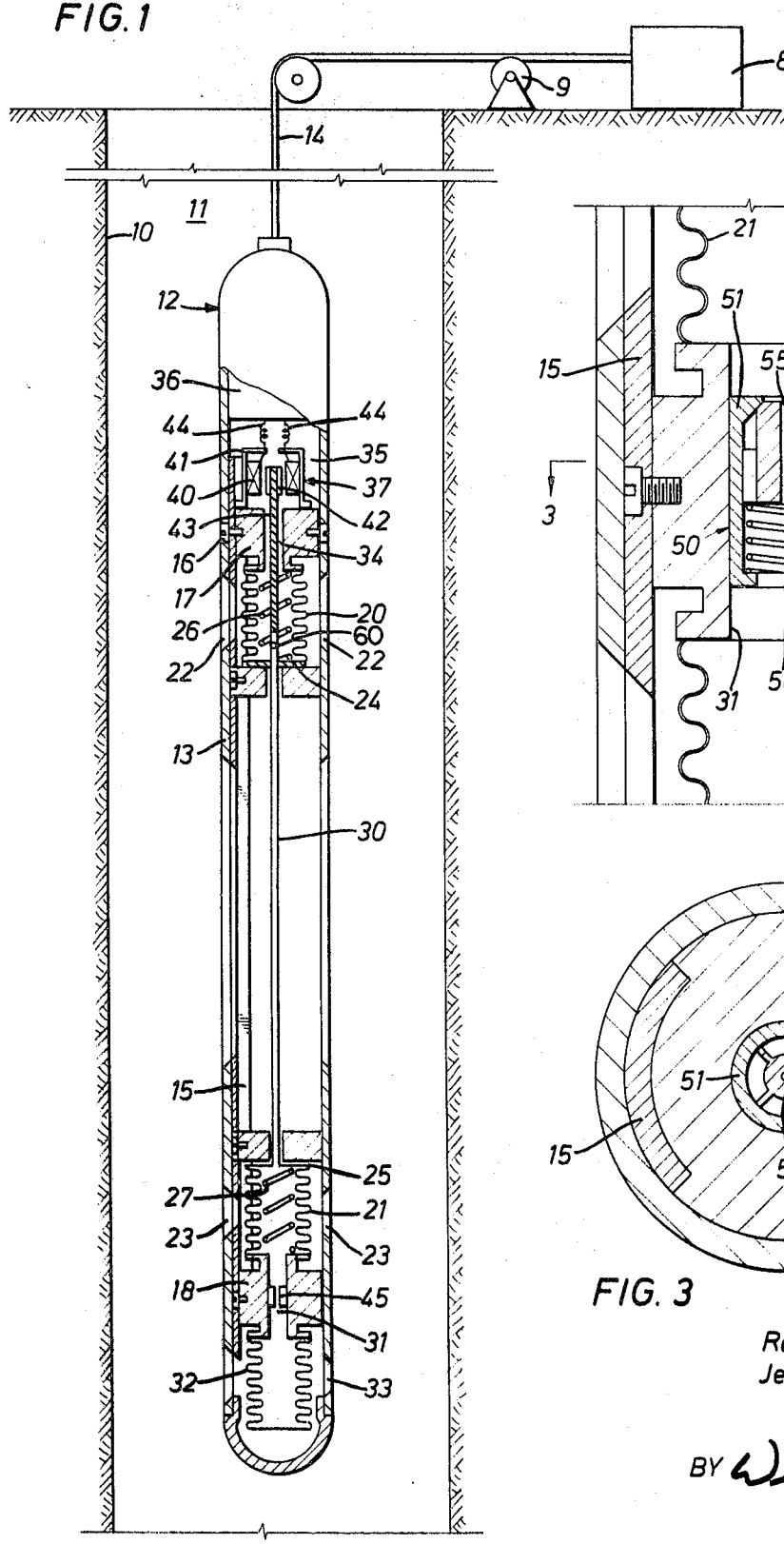
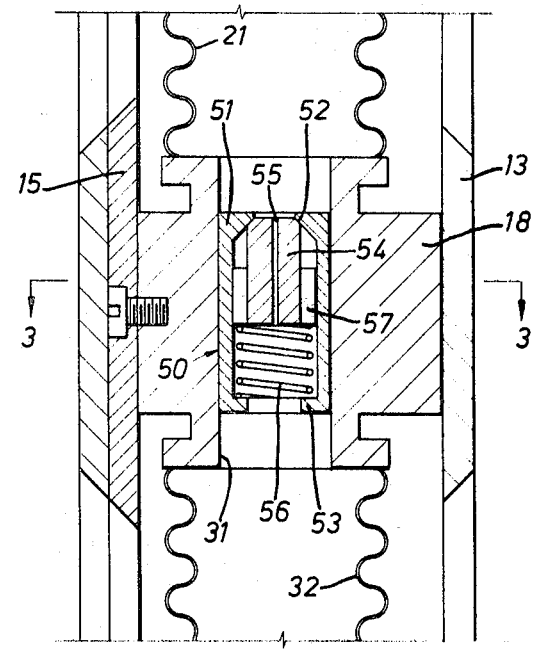
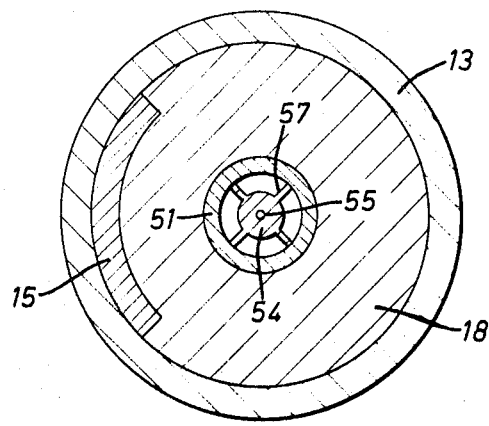
René Roussin &
Jean-Loup Bonnet
INVENTORS
BY *William J. Beard*
ATTORNEY ର୍ଟ୍ଟ
United States Patent Office 3,616,688
Patented Nov. 2, 1971

---

3,616,688
GRADIOMANOMETER APPARATUS
Rene Roussin, Marnes-la-Coquette, and Jean-Loup Bonnet, Verrieres-le-Buisson, France, assignors to Schlumberger Technology Corporation, New York, N.Y.
Filed Oct. 21, 1969, Ser. No. 867,993
Claims priority, application France, June 12, 1969,
6919455
Int. Cl. E21b 47/00, 47/06
U.S. Cl. 73—151                                           5 Claims

ABSTRACT OF THE DISCLOSURE

An illustrative embodiment of the present invention includes improvements for use in borehole fluid density measuring apparatus of the gradiomanometer type including an inertia operated check valve. The inertia operated check valve permits free fluid movement from a measuring bellows of the device into an expansion bellows if the measuring instrument experiences a sudden acceleration in excess of a predetermined value in moving through a well bore.

BACKGROUND OF THE INVENTION

This invention relates to apparatus for measuring the specific gravity or density of fluids in boreholes, and more particularly to apparatus often called single-chamber gradiomanometers comprising a mobile assembly of which the displacement is a function of the difference in pressure at two points in the fluid a fixed vertical distance apart.

Such an apparatus, described in more detail in the U.S. Pat. No. 3,455,157 granted to the assignee of the present application, comprises a mobile assembly mounted on a support, and consisting of two flexible bellows connected by a rigid tube. This mobile assembly is filled with liquid and its movement in relation to the support is a function of the difference in static pressure exerted by the borehole fluid on the bellows. Since the bellows are set a fixed vertical distance apart, this movement is also a function of the density or specific gravity of the fluid. The lower measuring bellows communicates via a passage with an expansion chamber which absorbs the variations in the volume of the filling liquid. A restriction placed in this passage eliminates any influence of the expansion chamber on the dynamic functioning of the mobile assembly. It is particularly possible, without taking into account the expansion chamber, to minimize the extraneous oscillations of this mobile assembly through the appropriate choice of its weight, and of the density and viscosity of the filling liquid.

The presence of this restriction, which thus offers numerous advantages, is however troublesome when the apparatus is subjected to longitudinal shocks. The lower bellows is then subjected to considerable pressure and is liable to become permanently deformed, giving rise to a drift in the position of the mobile assembly.

A primary object of the invention is to provide an improvement in specific gravity or density measuring apparatus permitting the elimination of the above-mentioned shortcomings.

According to the invention, an apparatus is provided for measuring the specific gravity or density of a fluid. The apparatus comprises two flexible bellows, one over the other on a support, and adapted to be subjected to the static pressure of the fluid, with the movable ends of the said bellows being connected by a rigid tube so as to form a single liquid-filled envelope. This envelope communicates with an expansion chamber via a passage comprising a restriction, and is further characterized by the fact that a bypass laid out in parallel with the restriction is normally closed by an inertia block driven upward by a spring. The thrust of the spring is chosen so that the inertia block opens the bypass while compressing the spring when the acceleration applied to the inertia block exceeds a predetermined value.

Other objects and advantages of the present invention may be best understood by way of the following description when taken in conjunction with the accompanying drawings in which:

BRIEF DESCRIPTION OF THE DRAWINGS

FIG. 1 is a sectional view of a specific gravity or density measuring apparatus of the present invention;

FIG. 2 is a sectional view of a part of the apparatus of FIG. 1 and showing the improvement of the present invention; and FIG. 3 is a sectional view along the line 3—3 of FIG. 2.

DESCRIPTION OF THE PREFERRED EMBODIMENT

Referring now to FIG. 1, a borehole 10 is filled with a fluid 11, crude oil for example, of which the specific gravity at various depths in the borehole is to be determined. A measuring apparatus 12, similar to the one described in the above-mentioned U.S. patent, comprises a tool body or casing 13 suspended from a conventional winch arrangement 9 at the surface by a cable 14 allowing it to be moved vertically within the borehole. Surface control and recording circuits 8 thus allow measurements to be made as a function of borehole depth of the apparatus 12. Inside the tool body 13 is an elongated carriage 15 secured by mounting screws 16 at a single level of the body so as to be able to expand freely. At the ends of carriage 15 are fixed two bases 17 and 18 on which are welded two measuring bellows 20 and 21 respectively defining upper and lower expansible fluid chambers. These bellows are subjected to the static pressure of the fluid 11 through slots 22 and 23 provided opposite the bellows in the casing and the carriage. The pressure-responsive bellows 20 and 21, which can contain extension-mounted helical springs 26 and 27, have movable ends 24 and 25 capable of moving along the longitudinal axis of the casing. A rigid tube 30 connects the movable ends 24 and 25 for movement in unison as well as putting into fluid communication the inside of the two belows 20 and 21 via the small port 60 in tube 30. The inside of the lower bellows 21 also communicates, via a passage 31 going through the base 18, with a third bellows 32 fixed at the lower part of the base 18. This bellows 32 which forms a variable-volume expansion chamber is subjected to the pressure of the fluid 11 through slots 33 in the casing. The upper bellows 20 communicates, via a passage 34 going through the base 17, with an upper chamber 35 delimited by the casing 13 and the lower face of a sealed electronic cartridge 36 placed at top of the apparatus. The upper chamber 35, the measuring bellows 20 and 21, the rigid tube 30 and the expansion bellows 32 form a single envelope filled with a liquid having suitable physical properties, such as kerosene for example.

In the upper chamber 35 is immersed a displacement sensor consisting of a differential transformer 37 comprising a coil 40 integral with a frame 41 and a movable core 42. This core 42 is connected mechanically to the rigid tube 30 by a connecting rod 43 which goes through the passage 34 of the base 17. This rod 43 may consist of metallic elements having different coefficients of expansion so as to compensate for variations in the density of the filling liquid as a function of temperature. The coil 40 is connected by conductors 44 to the electronic cartridge 36 which amplifies the signals received from this coil and transmits them to the surface over the cable 14.

In operation, if the density of the fluid 11 increases, the difference between the pressure exerted on the lower bellows and that on the upper bellows increases and the rigid tube moves downward thereby displacing the moving core 42. Conversely, a decrease in the density of the fluid 11 moves this core upward. The operation and the calibration of the apparatus are dealt with in greater detail in the above-mentioned U.S. patent, which further describes various compensating devices permitting a more accurate measurement to be obtained.

In particular, the passage 31 linking the measuring bellows 21 to the expansion bellows 32 is equipped with a restriction 45 the essential role of which is to divorce this expansion bellows from the dynamic functioning of the mobile assembly comprised by the measuring bellows and the rigid tube 30. Owing to this restriction, the mobile assembly and its filling liquid form a system independent of the expansion bellows. The oscillations of the mobile assembly can be reduced by a suitable choice of the weight of mechanical elements and of the density and viscosity of the liquid.

If, during lowering into the borehole, the apparatus is subjected to shocks, substantial overpressures appear in the lower measuring bellows 21 capable of bringing about a permanent deformation in the latter. It is thus desirable to eliminate this restriction when the accelerations communicated to the apparatus by the shocks are greater than a predetermined threshold value. This elimination is achieved by the device according to the apparatus shown in FIG. 2.

FIGS. 2 and 3 show the lower part of the apparatus on which can be seen the casing 13, the carriage 15, the base 18, the measuring bellows 21 and the expansion bellows 32. In the passage 31 is placed an inertial device 50 which comprises the restriction 45. This device comprises a sleeve 51 fixed in the passage 31. The sleeve is traversed by a longitudinal recess terminating on top in a truncated-cone surface 52 forming an annular seating surface of smaller diameter. At the lower part the sleeve 55 has an annular stop 53 projecting inward. In the recess of the sleeve 51 is slide-mounted an inertia responsive member 54 having a longitudinal bore 55 defining a fluid communication path and has a nose portion that is normally urged into seating engagement with the seating surface 52 under the action of a helical spring 56. The movable member 54 is centered in the recess of the sleeve by cross-pieces 57 (FIG. 3) which form, between them and the inner surface of the sleeve, a fluid bypass path in parallel with the bore 55.

In operation, the movable member 54 normally closes the upper opening of the sleeve 51 so that the small bore 55 is the only passage between the measuring bellows 21 and the expansion chamber 32. If, during lowering into the borehole, the apparatus is subjected to a large longitudinal shock, the inertia of the block 54 momentarily compresses the spring 56 thereby opening a fluid path bypassing the bore 55. Since this paralleled fluid path is much larger than the bore 55, the fluid can then pass quickly into the expansion bellows 32 without exerting any over-pressure on the lower measuring bellows 21.

It has been observed that by stopping or by starting the cable abruptly at the surface, the underground apparatus could be subjected to accelerations as high as 80 $g$, $g$ being the acceleration of gravity. These accelerations, capable of occurring during measurement, are nevertheless insufficient to bring about permanent deformations in the measuring bellows, even in the case of apparatus not having the above-described inertial device. On the other hand, certain shocks may subject the apparatus to accelerations which are clearly higher than this value 80 $g$. The thrust force F of the spring has thus been chosen equal to about 80 M$g$, M being the mass of the movable member 54. It will be noted that the bypass line generally opens before the pressure wave is applied to the measuring bellows because the block 54 is controlled by its inertia.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Well bore apparatus adapted for longitudinal movement through a well bore containing fluids and comprising: a body adapted for suspension in a well bore; pressure-measuring means including upper and lower pressure-responsive bellows longitudinally spaced on said body defining upper and lower expansible fluid chambers and respectively having movable portions adapted to move in response to fluid pressure differentials between the interior and exterior of said expansible chambers, and means interconnecting said movable bellows portions for movement together in unison and providing fluid communication between said expansible chambers; and means on said body including a variable-volume chamber, passage means providing fluid communication between said variable-volume chamber and said expansible chambers for accommodating volumetric changes in said bellows and means adapted for regulating fluid communication through said passage means including inertia-responsive means normally limiting fluid communication through passage means and adapted for increasing fluid communication through said passage means in response to changes in longitudinal acceleration of said well bore apparatus in excess of a predetermined magnitude.

2. The well bore apparatus of claim 1 wherein said fluid communication-regulating means include means defining a seating surface in said passage means, a movable body having a seat-engaging surface thereon movably disposed in said passage means and adapted for longitudinal movement therein in response to changes in longitudinal acceleration of said well bore apparatus, and biasing means normally urging said movable body to place said seat-engaging surface thereof into engagement with said seating surface to limit fluid communication through said passege means and adapted to yield in response to changes in longitudinal acceleration of said well bore apparatus in excess of a predetermined magnitude for allowing said movable body to move away from said seating surface to increase fluid communication through said passage means.

3. The well bore apparatus of claim 2 wherein said biasing means are selected to impose a biasing force on said movable body approximately equal to the product of 80 M$g$, M being the mass of said movable body and $g$ being the acceleration of gravity.

4. The well bore apparatus of claim 1 wherein said passage means include a tubular member extending longitudinally between said variable-volume chamber and one of said expansible chambers and defining therein an annular seat; and said inertia-responsive means include a movable body having a longitudinal passage therethrough defining a first fluid communication path and movably disposed for longitudinal movement in said tubular member for defining a second fluid communication path between said movable member and said tubular member, means on said movable body defining a seat-engaging surface, and biasing means normally urging said movable body longitudinally in one direction to place said seat-engaging surface into seating engagement with said annular seat for blocking fluid communication through said second fluid communication path and adapted to yield in response to changes in longitudinal acceleration of said well bore apparatus to allow longitudinal movement of said movable body in the opposite direction away from said annular seat for opening fluid communication through said second fluid comunication path around said movable body.

5. The well bore apparatus of claim 4 wherein said biasing means are selected to impose a biasing force on said movable body approximately equal to the product of 80 M$g$, M being the mass of said movable body and $g$ being the acceleration of gravity.

References Cited
UNITED STATES PATENTS

| | | | |
|---|---|---|---|
| 2,860,648 | 11/1958 | Harrison | 137—38 |
| 2,946,339 | 7/1960 | Fairchild et al. | 137—38 |
| 3,455,157 | 7/1969 | Le Haye et al. | 73—151 |

RICHARD C. QUEISSER, Primary Examiner

M. SMOLLAR, Assistant Examiner

U.S. Cl. X.R.

73—153, 438